2 Sheets--Sheet 1.

OBERLIN SMITH.
Improvement in Punching-Machines.

No. 127,112.          Patented May 21, 1872.

Witnesses.
C. H. Poole
John R. Young

Inventor.
Oberlin Smith, by
Prindle and Co., his
att'ys.

AM. PHOTO-LITHOGRAPHIC CO. N.Y. (OSBORNE'S PROCESS.)

2 Sheets--Sheet 2.
OBERLIN SMITH.
Improvement in Punching-Machines.
No. 127,112. Patented May 21, 1872.
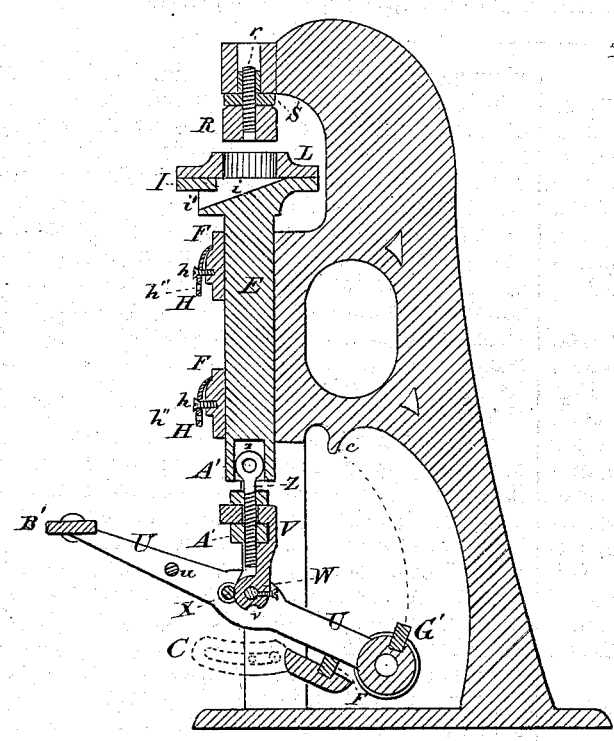
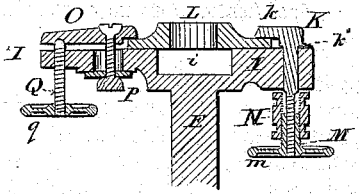
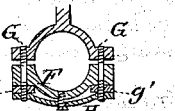
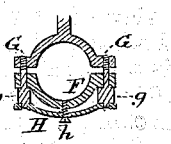
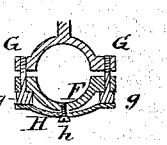
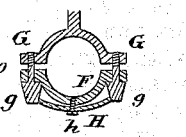
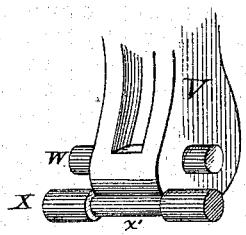
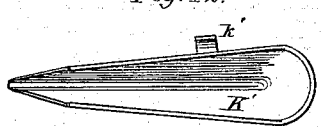
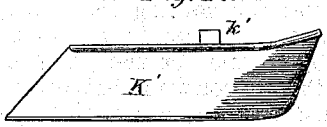

UNITED STATES PATENT OFFICE.

OBERLIN SMITH, OF BRIDGETON, NEW JERSEY.

IMPROVEMENT IN PUNCHING-MACHINES.

Specification forming part of Letters Patent No. 127,112, dated May 21, 1872.

*To all whom it may concern:*

Be it known that I, OBERLIN SMITH, of Bridgeton, in the county of Cumberland and in the State of New Jersey, have invented certain new and useful Improvements in Lever Punch-Presses; and do hereby declare that the following is a full, clear, and exact description thereof, reference being had to the accompanying drawing making a part of this specification, in which—

Figure 1:
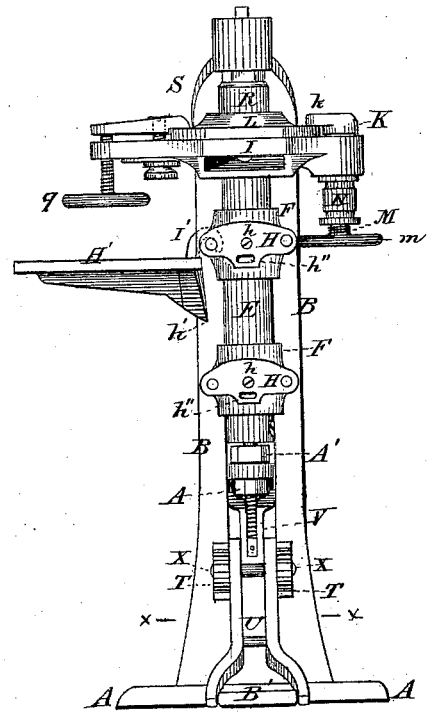
Figure 2:
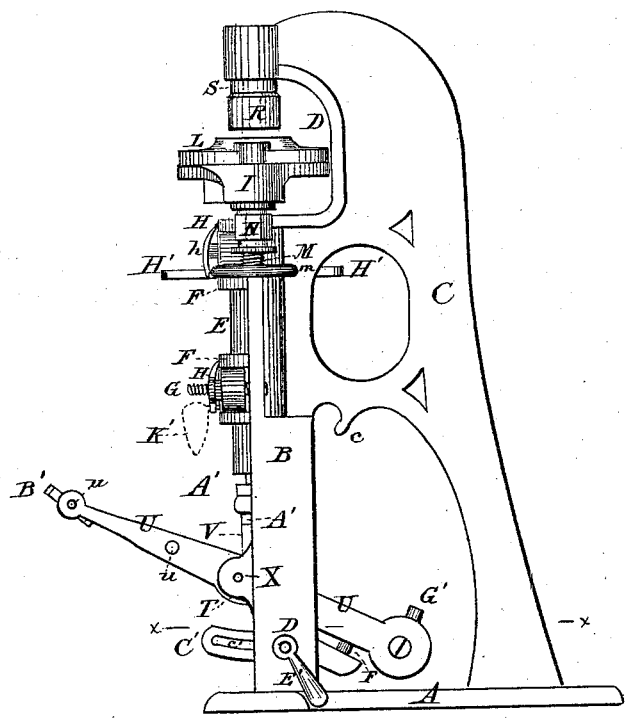
Figure 4:
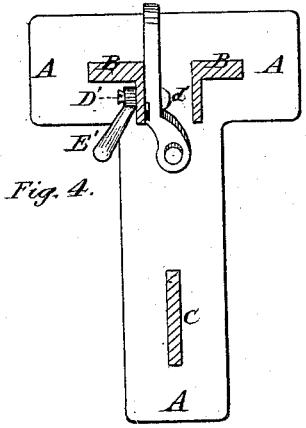
Figure 3:
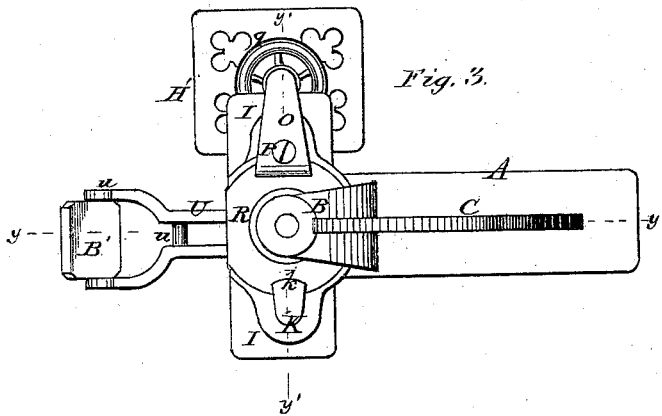

Figure 1 is a front elevation of my improved device. Fig. 2 is a side elevation of the same. Fig. 3 is a plan view of its upper side. Fig. 4 is a horizontal section on line $x\ x$ of Figs. 1 and 2. Fig. 5 is a vertical section of line $y\ y$ of Fig. 3. Fig. 6 is a like view of the supporting-table and its clamping devices on line $y'\ y'$ of Fig. 3. Figs. 7, 8, 9, and 10 are horizontal central sections of different forms of journal-boxes used for containing the sliding bar. Fig. 11 is a perspective view of the lower end of the pitman. Fig. 12 is a plan view of the upper side of the blank-trough; and Fig. 13 is a front elevation of the same.

Letters of like name and kind refer to like parts in each of the figures.

My invention is an improvement upon a class of devices commonly known as punch-presses; and it consists principally in the means employed for securing the lower die to or upon the bed-plate, substantially as is hereinafter shown. It consists, further, in the means employed for holding the cap of a journal-box outward against its screws or nuts, substantially as and for the purpose hereinafter set forth. It consists, further, in the adjustable treadle-stop, constructed as shown, and combined with the treadle and with the main frame, substantially as and for the purpose set forth. It consists, further, in the means employed for securing in place the fulcrum-pin of the treadle, substantially as is hereinafter shown and described. It consists, further, in the combination of the frame, treadle, adjustable stop, and rubber buffers, substantially as and for the purpose hereinafter specified. It consists, finally, in the waste or drip-trough, when constructed and combined with said machine, substantially as and for the purpose hereinafter set forth.

In the annexed drawing, A represents the base plate of the frame, having the form in plan view shown in Fig. 4, from the front side of which extends vertically upward a column, B, divided at its lower end, and strengthened by means of a brace, C, which extends from the central and upper portions of said column downward and rearward to the rear portion of said base plate, the whole being preferably cast in one piece, and forming the frame of the machine. Near its upper end the front side of the frame is extended rearward, upward, and then forward, so as to form a recess, D, for the reception of the bed-plate for the dies. From its divided portion upward the front side of the column B is provided with a semicircular recess, which corresponds to and receives one side of the sliding or operating bar E, which bar is held in vertical position by means of two caps, F, that are placed over or against its front side and against the corresponding face of said column, and are connected therewith by means of suitable screws G, provided upon their outer ends with heads $g$ or nuts $g'$. In order that the caps F may be held outward against their bolts or screws, and also that said screws or their nuts may be prevented from turning, when once set, a clamp, H, is placed upon the forward face of each cap, and extending horizontally outward, has its ends rest upon the heads $g$ or nuts $g'$. A screw, $h$, passing horizontally through the center of the clamp, has its inner threaded end fitted into a corresponding opening in the cap F, so that, by turning said screw inward, its head will bear upon said clamp and cause the latter to spring inward. As thus arranged, it will be seen that, as the screw $h$ is turned inward, the ends of the clamp will press with increased force upon the screw-heads $g$ or the nuts $g'$, and render impracticable their accidental displacement, while at the same time the effect of said clamp upon the cap will be to hold it rigidly outward and prevent it from bearing against the sliding bar in other than an uniform manner. The operation of this clamp is the same whether its ends bear upon the outer faces of bolt-heads or nuts, as shown in Figs. 7, 8, and 9, or against the sloping sides of either of said parts, as shown in Fig. 10. Secured to or upon the upper end of the bar E is a bed-plate, I, which has a suitable size and shape to adapt it to the dies employed, and is provided with a circular central recess, $i$, which extends vertically downward to a short distance, and from thence sloping downward and forward at an angle of about forty-five degrees, has a front opening, $i'$, said recess being intended for the escape of the blanks after they leave the dies. The lower or female dies are placed centrally upon the bed-plate, and secured in position thereon by means of two clamps, constructed in the following-described manner: A bolt, K, provided upon its upper end with a horizontally-and-inwardly projecting head, $k$, and upon its lower end with a screw-thread extends downward through a suitable opening in the bed-plate in such position as to cause said head to project over and bear upon the edge and upper side of a die, L. Fitted to or upon the threaded end of the bolt K is a sleeve, M, threaded interiorly to correspond with said screw, and provided upon its periphery with a second screw-thread, which has about one-half the pitch of the inner one. The exterior of the sleeve M fits into and is contained within a second sleeve or long nut, N, which, inclosing said sleeve M and the bolt, has its upper end near to or in contact with the lower side of the bed-plate. A hand-wheel, $m$, attached to the lower end of the sleeve M, completes the device, the operation of which is as follows:

By turning forward upon the sleeve M, the same and the nut N are carried upward upon the thread of the bolt until the upper end of said nut bears against the lower side of the bed-plate and has its motion checked by the friction between said surfaces, after which each revolution of said sleeve carries it upward in accordance with the pitch of its outer or finer thread, and relatively draws the bolt downward in accordance with the pitch of the inner or coarser thread, the real downward motion of said bolt being the difference between the pitches of said threads. Upon turning backward upon the wheel $m$, the nut N is slackened, and by means of the friction between its inner surface and the exterior of the sleeve, moves freely with the latter until again brought into contact with the bed-plate when the "differential" principle is again brought into operation. Upon the outer side of the bolt K is placed a key, $k'$, which fits into a corresponding key-seat within the bed-plate, and prevents said bolt from revolving. By loosening the bolt and raising it so as to release its key from engagement, said bolt can be turned around so as to remove its head from over the die.

Another form of fastening, as shown in Fig. 6, consists of a clamp, O, provided near its inner end with an opening, through which and through a corresponding radial slot in the bed-plate passes a spherical-headed bolt, P. A screw, Q, provided upon its lower end with a hand-wheel, $q$, passes upward through the outer end of said bed-plate, and has its upper end bearing against the lower side and outer end of said clamp, so that, by turning said screw forward, the outer end of the clamp is raised and its inner end correspondingly depressed, the bolt P operating as a fulcrum, against which the upward pressure of said clamp is exerted whenever its inner end finds a bearing. As thus constructed, the clamp is placed with its inner end upon the die, the fulcrum-bolt adjusted to length, so as to be taut whenever said clamp occupies a horizontal position, after which, by screwing upward upon the bolt Q, said clamp is caused to firmly gripe said die and secure it in position upon the bed-plate. The upper or male die R is provided with a central bolt, $r$, which, passing upward within a suitable sleeve or nut, S, that fits into the recessed upper arm of the frame, secures said die in position. A reciprocating vertical motion is imparted to the sliding bar by means of the following-described devices: Pivoted to and between two lugs, T, which are secured upon and extend forward from the front side of the column B, near its lower divided end, is a trussed lever, U, composed of two side rails connected together by means of three or more horizontal studs $u$, so as to have great strength combined with a comparatively small weight. Pivoted within the lower end of the sliding bar is one end of a pitman, V, which from thence extends downward, and has its opposite end pivoted with the lever U, the pivotal bearing W of said pitman being in rear of the bearing X of said lever, and said latter bearing in front of the line of said sliding bar.

As thus arranged it will be seen that a depression of the forward end of the lever U will cause the pitman and sliding bar to be raised, and that, as said motion continues, the pivotal bearing of said pitman will pass upward and forward until nearly or quite in a line with the axial bearing of said lever and the upper pivoted end of said pitman, so that while the relative motion of said sliding bar regularly decreases from its lowest to its highest point the power exerted thereon by said lever increases in a like proportion.

In order that the length of the pitman may be varied so as to regulate the height of the bed-plate, its upper end is cut away and provided with a central opening, through which passes downward a threaded bolt, Z, having upon its upper end an eye, $z$, by means of which said bolt is pivoted to or within the lower end of the sliding bar. A central recess, open at the front, is provided within the pitman for the reception of the lower end of the bolt, and also for the reception of a nut, A', which encircles said bolt and bears against the upper end of said recess. A second nut, A', is placed upon said bolt above said pitman, and, bearing against the upper end of the latter, confines it in position between the same and said lower nut.

If, now, it is desired to lengthen or shorten the pitman, the nuts are screwed upward or downward upon their bolt until the desired degree of adjustment is secured, after which, by turning said nuts toward each other, all the parts composing the pitman are firmly united and made as rigid as though constructed of or from one piece of metal.

The lever U substantially fills the space between the lower sections of the column B, and as the pivotal bearing-pin W of the pitman is entirely within the line, fore and aft, of said column, it cannot work out of the lever while the latter is in place. As, however, the axial bearing-pin X of the lever is entirely outside of the frame, it is necessary that some provision should be made for securing said pin in longitudinal position, which result is accomplished by forming a groove, $x'$, within its periphery and between the side rails of said lever, into which groove the lower end and front side of the pitman fits, its sides bearing against the sides of said groove and effectually preventing the longitudinal movement of said pin while said pitman is in place. In order that the bearing-pin X may be removed when desired, the lower end of the pitman V is provided with a semicircular notch, $v$, which, when the upper end of said pitman is disengaged and turned rearward, coincides with and permits the passage of said pin. The rear end of the foot-lever is weighted or overbalanced so as to cause it to drop downward to the position shown in Figs. 2 and 5, while the front end of said lever or treadle is provided with a journaled or pivoted foot-piece, $B'$, which conforms to and furnishes a firm bearing for the foot placed thereon, regardless of the varying relative position of the same and of said lever as the latter rises and falls. The downward motion of the rear end of the treadle-lever is limited, by means of a stop, which consists of a bar, $C'$, provided with a central longitudinal slot, $c'$, which extends from near its forward end to or beyond its longitudinal center, and forms the arc of a circle, of which the fulcrum-pin of said treadle is the center. The bar $C'$ is placed against the inner side of one of the sections of the column B, beneath the treadle, and is secured thereon by means of a bolt, $D'$, which passes through the slot $c'$ and through said section, and is provided upon its inner end with a head, $d'$, and upon its outer end with a nut, $E'$. A stud, secured within and extending inward from the inner face of the section, between its front edge and the bolt $D'$, fits into the slot $c'$ of said bar and holds the latter in position concentric to the center of motion of the treadle. The rear end of the bar or stop C is sloped downward and rearward, upon a line with the lower side of the treadle, and has within its face a rubber pad or buffer, $F'$, which receives the impact of said treadle as it falls downward.

As thus arranged, it will be seen that by loosening the nut $E'$ the stop $C'$ can be moved rearward and upward so as to shorten the stroke of the treadle, or it can be drawn forward until the rear end of said treadle nearly strikes against the base-plate of the frame.

The upward thrust of the lever is received upon and the shock lessened by means of a rubber buffer, $G'$, which is secured within the upper side of the overbalance-weight, and strikes against a projecting portion, $c'$, of the frame-brace C.

For use with many kinds of work a table is necessary; but as such table would be in the way when the machine was used for other purposes, it must, of necessity, be detachable. To accomplish this result a table, $H'$, having a suitable size, is provided upon one side with a vertical lug, $h'$, which extends horizontally outward to a short distance, and is provided upon its outer face with a vertical groove, which corresponds to and embraces the edge of the column B. A bar, $I'$, extends upward from one side of the lug $h'$, and at its upper end curves inward and downward, so as to embrace the projecting end of one of the cap-bolts or any equivalent device.

As thus arranged, it will be seen that the weight of the table is supported by the hook-bar, while its horizontal position is insured by means of the grooved lug $h'$. To remove the table it is only necessary that its outer end should be raised until the lug $h'$ is released from engagement with the edge of the frame, after which the hooked bar may be moved rearward until disengaged from the bolt or stud.

In order that the blanks may be caught as they fall from the dies, a trough, $K'$, having the general form shown in Figs. 12 and 13, is suspended from the front side of either clamp H by means of lug $k'$, which extends rearward to a distance equal to the thickness of said clamps, and then upward, and which fits to or within a slot, $h''$, formed in the lower portion of the same. The horizontal portion of the lug $k'$ rests within its slot, while the vertical portion of said lug bears against the rear side of the clamp and prevents the trough from dropping downward and rearward beyond the desired position. To remove this trough it is only necessary to turn the same slightly outward and upward, when the lug may be withdrawn from its clamp.

Having thus fully set forth the nature and merits of my invention, what I claim as new is—

1. The means employed for securing the lower die to or upon the bed-plate, consisting of the bolt K provided with the head $k$, the interiorly and exteriorly threaded sleeve M provided with the wheel $m$, and the nut N, when said parts are combined with each other and with the bed-plate, substantially as and for the purpose shown.

2. The means for holding the cap F outward against its confining bolts or nuts, consisting of the clamp H, connected with said cap at its center, and bearing upon said bolts or nuts at its ends, substantially as set forth.

3. The adjustable treadle-stop $C'$, constructed as shown, and combined with the column B, the treadle U, the bolt $D'$, and the nut E', substantially as and for the purpose set forth.

4. The fulcrum-pin X provided with the groove $x'$, in combination with the pitman V provided with the semicircular notch $v$, substantially as and for the purpose specified.

5. The combination of the frame, the treadle U, the adjustable stop C', and the rubber buffers F' and G', substantially as and for the purpose shown and described.

6. The blank-trough K' provided with the lug $k'$, and combined with the clamp H, substantially as and for the purpose shown.

In testimony that I claim the foregoing I have hereunto set my hand this 20th day of March, 1872.

OBERLIN SMITH.

Witnesses:
   FRED. F. SMITH,
   ELMER C. WARE.